United States Patent
Marchetti

(10) Patent No.: US 10,562,380 B2
(45) Date of Patent: Feb. 18, 2020

(54) LIGHT WEIGHT REMOVABLE BODY DOOR SYSTEM

(71) Applicant: Ford Global Technologies, LLC, Dearborn, MI (US)

(72) Inventor: Bernard Marchetti, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/971,848

(22) Filed: May 4, 2018

(65) Prior Publication Data

US 2019/0337365 A1 Nov. 7, 2019

(51) Int. Cl.
*B60J 5/04* (2006.01)

(52) U.S. Cl.
CPC ........... *B60J 5/0476* (2013.01); *B60J 5/0425* (2013.01); *B60J 5/0441* (2013.01); *B60J 5/0487* (2013.01); *B60J 5/0463* (2013.01)

(58) Field of Classification Search
CPC . B60J 5/04; B60J 5/0425; B60J 5/0437; B60J 5/0441; B60J 5/0463; B60J 5/0476
USPC ...................................... 296/146.6, 147, 148
See application file for complete search history.

(56) References Cited

U.S. PATENT DOCUMENTS

| | | | |
|---|---|---|---|
| 4,850,636 A * | 7/1989 | McLaren | B60J 5/0437 296/146.5 |
| 6,343,832 B1 | 2/2002 | Queener et al. | |
| 6,988,759 B2 | 1/2006 | Fin et al. | |
| 7,267,384 B1 | 9/2007 | Coviello | |
| 7,686,379 B2 | 3/2010 | Lemieux | |
| 9,758,090 B1 | 9/2017 | Salter et al. | |
| 2017/0203640 A1 | 7/2017 | Rafeld | |
| 2018/0297455 A1* | 10/2018 | Hale | B60J 5/0476 |
| 2019/0061490 A1* | 2/2019 | Getzschman | B60J 5/0487 |
| 2019/0232766 A1* | 8/2019 | Patel | B60J 5/0437 |

FOREIGN PATENT DOCUMENTS

DE 102011083812 A1 * 4/2013
DE 102011083812 A1    4/2013

OTHER PUBLICATIONS

JCR Offroad JCR Half Door Armrest (Front) for Jeep Wrangler JK, https://atozfabrication.com/jcr-offroad-jcr-half-door-armrest-front-for-jeep-wrangler-jk.html.

* cited by examiner

*Primary Examiner* — Jason S Daniels
(74) *Attorney, Agent, or Firm* — Vichit Chea; Carlson, Gaskey & Olds, P.C.

(57) ABSTRACT

A convertible vehicle door assembly includes a gate subassembly including an electrical panel, latch handle and is secured by hinges and a latch to a vehicle static structure. An outer door subassembly is removably secured to the gate subassembly by at least one quick connect mechanism. The outer door includes a window assembly operable by the electrical control panel.

18 Claims, 5 Drawing Sheets

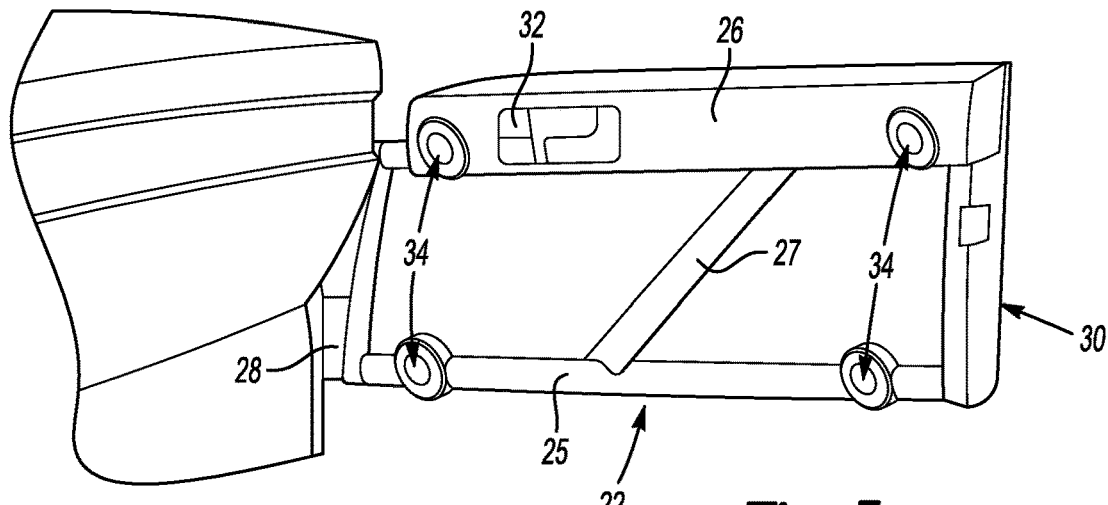
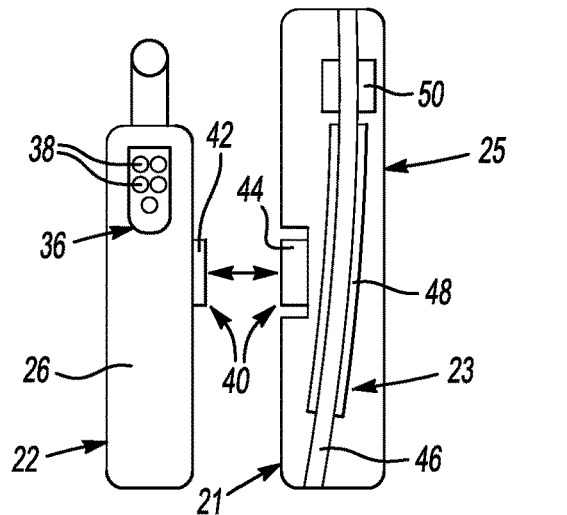
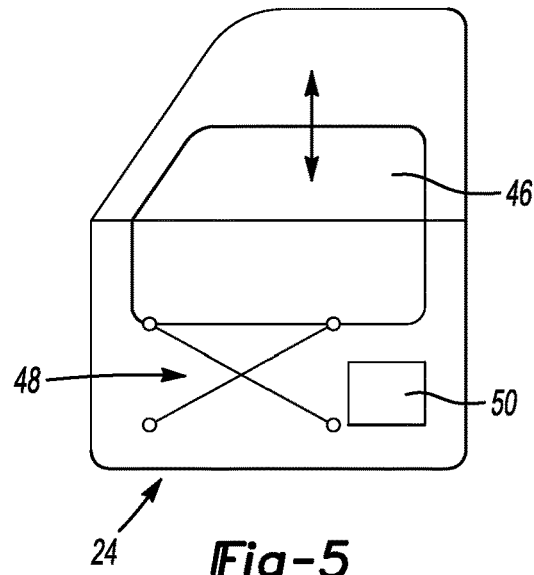
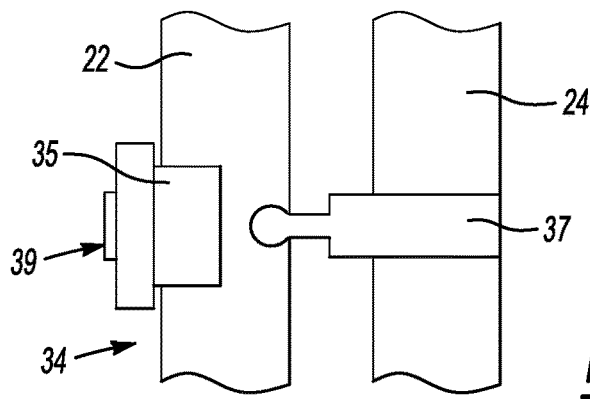

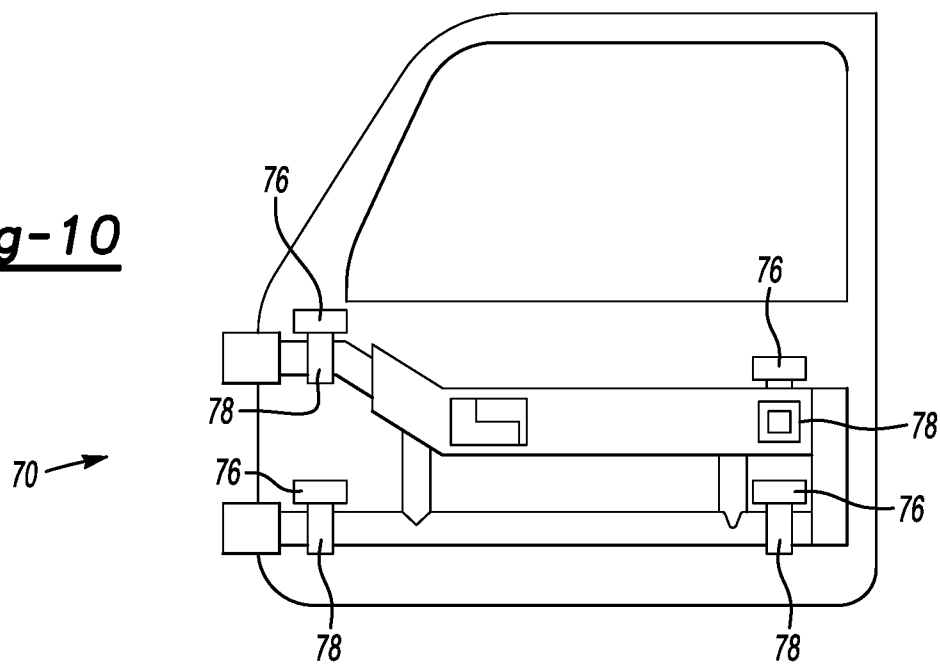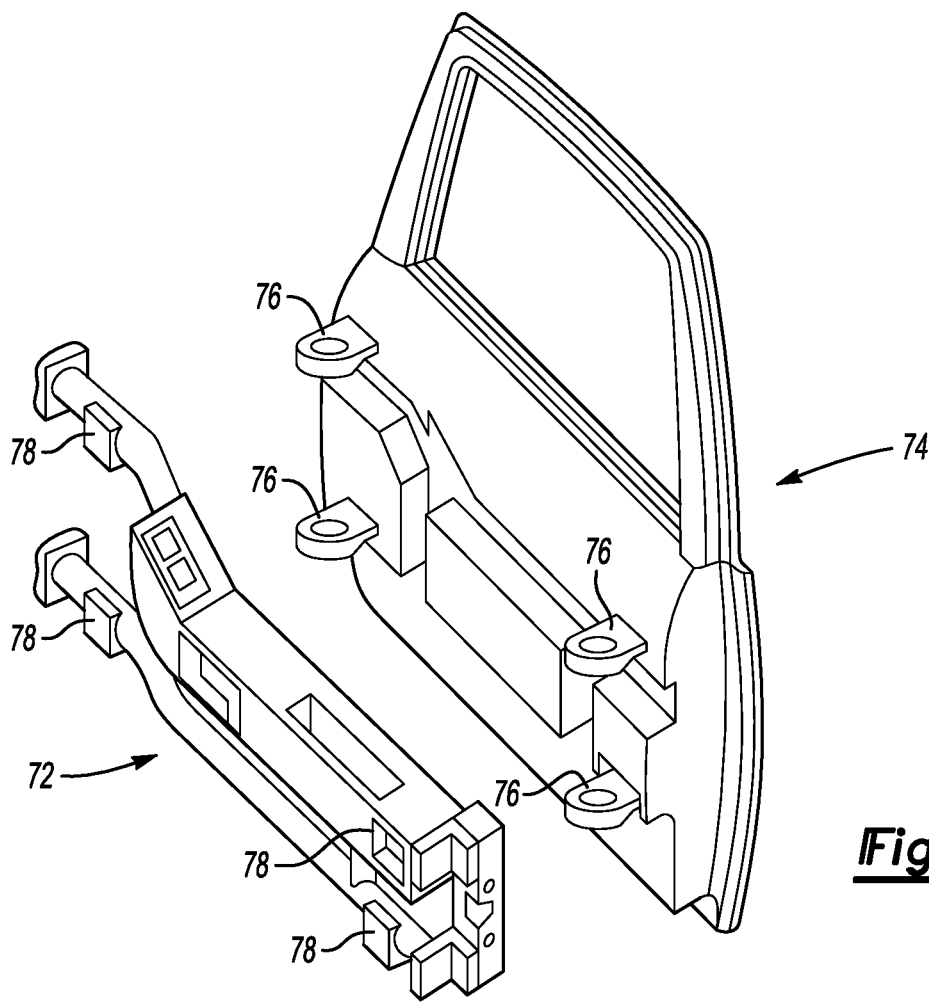

LIGHT WEIGHT REMOVABLE BODY DOOR SYSTEM

TECHNICAL FIELD

This disclosure relates to a door including a removable portion mounted to a door frame structure.

BACKGROUND

Vehicles that are designed for off-road use may include removable doors that provide an open air experience. Moreover, the door is removable to prevent damage that may occur when driving in an off-road environment. Secondary door structures are sometimes installed after the standard door assembly is removed. Removal and assembly of alternate door structures requires removal and storage of the standard door followed by assembly and alignment of the secondary door structure.

Vehicle manufactures continually seek improvements in operation, assembly and costs to capture and maintain customer interest and loyalty.

SUMMARY

A reconfigurable vehicle door assembly according to an exemplary aspect of the present disclosure includes, among other things, a gate subassembly including an electrical panel, latch handle and is secured by hinges and a latch to a vehicle static structure and an outer door subassembly removably secured to the gate subassembly by at least one quick connect mechanism. The outer door includes a window assembly operable by the electrical control panel.

In a further non-limiting embodiment of the foregoing reconfigurable vehicle door assembly, the electrical control panel includes a lock switch and a window switch.

In a further non-limiting embodiment of the foregoing reconfigurable vehicle door assembly, including an electrical interface that includes a first portion fixed to the gate subassembly and a second portion fixed to the outer door subassembly and mounting of the outer door subassembly to the gate assembly automatically aligns and connects the first portion to the second portion.

In a further non-limiting embodiment of the foregoing reconfigurable vehicle door assembly, the window assembly within the outer door subassembly includes an actuator receiving electrical signals through the electrical interface and that is operable by the window switch.

In a further non-limiting embodiment of the foregoing reconfigurable vehicle door assembly, the electrical interface includes an electrical connection for at least one electrical appliance other than the actuator disposed within the outer door assembly.

In a further non-limiting embodiment of the foregoing reconfigurable vehicle door assembly, the gate subassembly comprises upper and lower tubular cross-beams.

In a further non-limiting embodiment of the foregoing reconfigurable vehicle door assembly, the gate subassembly includes an armrest that remains mounted to the gate subassembly when the outer door assembly is removed.

In a further non-limiting embodiment of the foregoing reconfigurable vehicle door assembly, the at least one quick connect mechanism comprises clamps that clamp to upper and lower portions of the gate subassembly.

In a further non-limiting embodiment of the foregoing reconfigurable vehicle door assembly, the outer door assembly includes an outer door latch handle that is operable to actuate the latch when the outer door assembly is secured to the gate subassembly.

In a further non-limiting embodiment of the foregoing reconfigurable vehicle door assembly, the outer door subassembly includes an outer surface spaced apart from an inner surface and the window assembly is disposed within a space between the inner surface and the outer surface.

In a further non-limiting embodiment of the foregoing reconfigurable vehicle door assembly, the latch includes an actuator for moving the latch between a locked condition and an unlocked condition.

In a further non-limiting embodiment of the foregoing reconfigurable vehicle door assembly, a coupling between a side view mirror mounted to a vehicle static structure is provided such that the side view mirror moves with the door assembly when moved between open and closed positions.

A reconfigurable vehicle door assembly according to another exemplary aspect of the present disclosure includes, among other things, a gate subassembly having an armrest including an electrical control panel and an inner latch handle, the gate subassembly secured by hinges and a latch to a vehicle static structure and an outer door subassembly removably secured to the gate subassembly by at least two clamps. The outer door including a window assembly operable by a window switch of the electrical control panel.

In a further non-limiting embodiment of any of the foregoing reconfigurable vehicle door assembly an electrical interface includes a first portion fixed to the gate subassembly and a second portion fixed to the outer door subassembly and mounting of the outer door subassembly to the gate assembly automatically aligns and connects the first portion to the second portion.

In a further non-limiting embodiment of any of the foregoing reconfigurable vehicle door assembly, the outer door assembly includes an outer latch handle that is operable to actuate the latch when the outer door assembly is secured to the gate subassembly.

A method of assembling a reconfigurable vehicle door according to another exemplary aspect of the present disclosure includes the steps of mounting a gate to a static structure by hinges and a latch, removably attaching an outer door to the gate with at least one clamp and coupling a first electrical interface portion disposed on the gate to a second electrical interface portion disposed on the outer door to provide electrical communication between a switch on the gate and an actuator within the outer door.

In a further non-limiting embodiment of the foregoing method of assembling a reconfigurable vehicle door, including coupling an outer latch handle to the latch when attaching the outer door to the gate.

In a further non-limiting embodiment of any of the foregoing methods of assembling a reconfigurable vehicle door, the gate includes an armrest having an electrical control and an inner latch handle and the first electrical interface portion is supported within the armrest.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a side view of an example gate assembly.

FIG. 4 is a schematic view of an example electric interface.

FIG. 5 is a schematic view of an example window operating mechanism.

FIG. 6 is a schematic view of an example door clamp assembly.

FIG. 10 is a side view of another example door assembly embodiment.

FIG. 11 is a separated view of the example door assembly embodiment.

DETAILED DESCRIPTION

Figure 1:
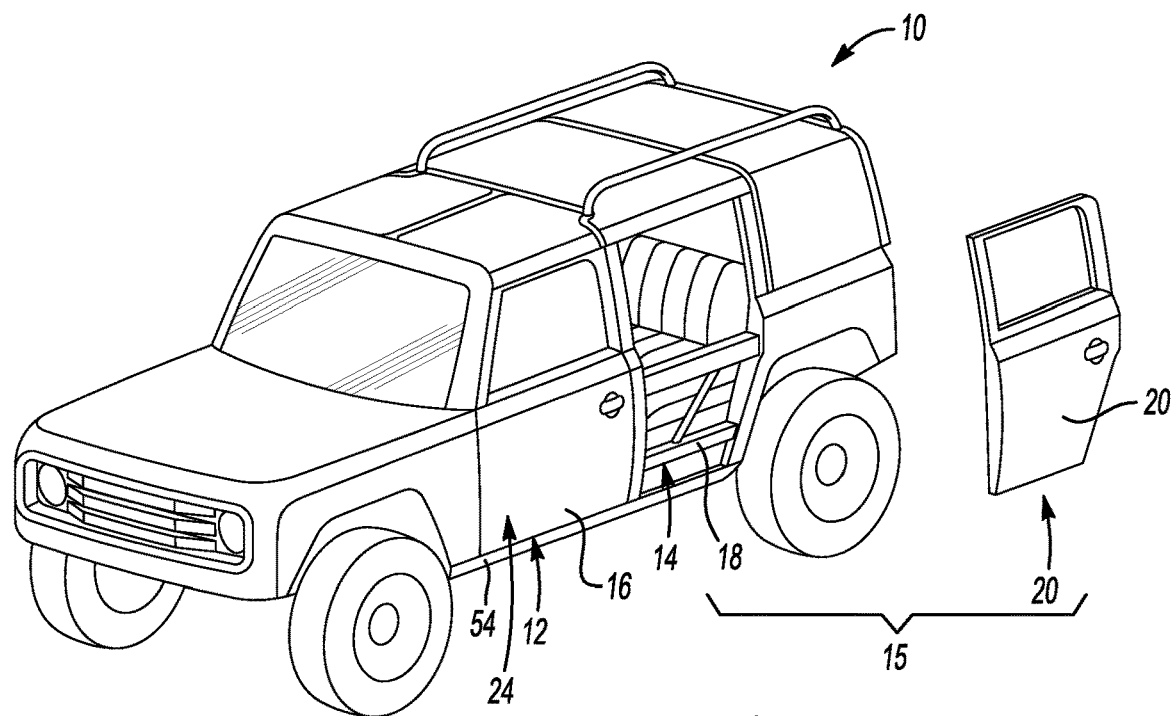
FIG. 1 is a schematic view of an example vehicle including an example reconfigurable door assembly embodiment.

Referring to FIG. 1 a vehicle 10 includes a forward door opening 12 and a rear door opening 14. A reconfigurable door assembly 16, 15 is shown for each of the forward door opening 12 and rear door opening 14. The door assembly 15 for the rear door 14 includes a removable outer door 20 and a rear gate assembly 18. The forward door opening 12 illustrates the door assembly 16 with a front removable outer door assembly 24 installed on the vehicle 10.

The rear door opening 14 shows the door assembly 15 reconfigured such that the gate assembly 18 remains on the vehicle 10 and the outer door 20 is removed. Removing the outer door 20 provides an open air experience for occupants while maintaining the closure and protection provided by the rear gate assembly 18. It should be appreciated that the door assemblies 16, 15 will be modified to fit the respective forward door opening 12 and rear door opening 14, but include similar structures that enable reconfiguration.

Figure 2:
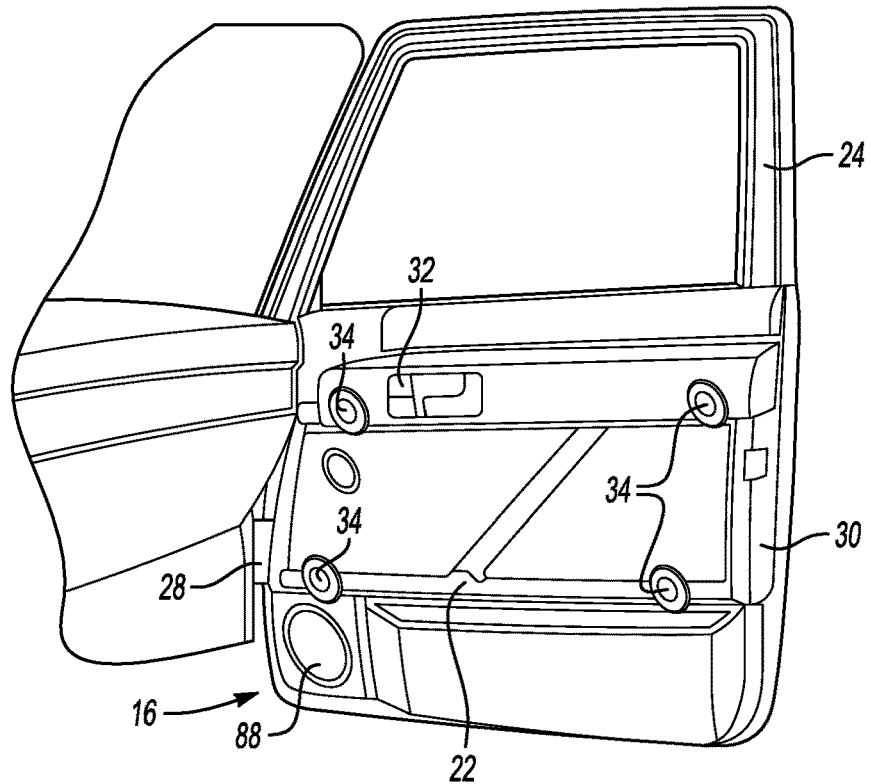
FIG. 2 is a side view of an example door assembly.

Referring to FIGS. 2 and 3 with continued referenced to FIG. 1, the example front door assembly 16 for the forward door opening 12 is shown and includes the outer door assembly 24 that can be removed from a forward gate assembly 22. The gate assembly 22 is attached to the vehicle by hinges 28 and includes a latch 30. The gate assembly 22 further includes an armrest 26 with an inner latch handle 32. The outer door 24 is attached to the gate assembly 22 with clamps 34. The outer door 24 includes window operating features as well as a complete outer skin 20 to enclose the vehicle cabin.

The outer door structure 24 also may include other accessory features such as a speaker 88, and accessory storage bins not utilized when the outer door 24 is removed.

The inner gate assembly 22 includes the hinges 28 and the latch 30 for securement to the vehicle 10 and does not need to be removed. The gate assembly 22 includes inner latch handle 32 within the armrest 26 for actuating the latch 30. The example inner gate assembly 22 is constructed of tubes and includes two cross-members 25 and a stiffener 27 extending between the cross-members 25. The armrest 26 is attached to the tubular structures comprising the gate assembly 22 and houses control features. It should be appreciated, that although the example gate assembly 22 is constructed from round tubular structures, other structures such as rectilinear or other shapes may be utilized and are within the contemplation of this disclosure.

Referring to FIG. 4 with continued reference to FIGS. 2 and 3, an electrical interface 40 is provided between the gate assembly 22 and the outer door assembly 24. The example electrical interface 40 includes a first portion 42 mounted to the armrest 26 and a second portion 44 mounted to a corresponding part of the outer door assembly 24. The assembly of outer door assembly 24 to the gate assembly 22 provides automatic connection and alignment between the first portion 42 and second portion 44 of the electrical interface 40. Control and power conductors and other electrical communication structures are routed into the armrest 26 from the vehicle 10. From the armrest 26 the required power and control communication for features within the outer door 24 are provided through the electric interface 40. In the disclosed example, the armrest 26 supports a control panel 36 including a plurality of switches 38. The switches 38 control, for example, operation of the window and door locks. The control panel 36 may include other control features for controlling accessory items provided within the vehicle 10. Electrical interface 40 provides electrical communication of both power and control signals to electrical devices supported within the door assembly 24.

Referring to FIG. 5 with continued reference to FIG. 4, the example outer door assembly 24 includes a window 46 that is movable between an open and closed position by way of an operating mechanism 48. The outer door assembly 24 includes the outer surface 25 spaced apart from an inner surface 21 and the window 46 and operating mechanism is disposed within a space 23 between the inner surface 21 and the outer surface 25. An actuator 50 is provided within the door assembly 24 to drive the operating mechanism 48 and move the window 46. The actuator 50 is provided with electric power and control signals through the electric interface 40 provided between the door assembly 24 and the gate assembly 22.

Referring to FIG. 6 with continued reference to FIGS. 2 and 3, the example outer door assembly 24 is attached to the gate assembly 22 by a way of a plurality of clamps 34. The clamps 34 provide a means of removing the door assembly 24 without requiring tools or other special accessory items. In one disclosed example the clamps 34 include a clamp mount 35 attached to the gate assembly 22 that receives a clamp member 37 mounted to the door assembly 24. In this example each of the mounts 34 includes a button 39 that may be depressed to allow removal of the attachment portion 37.

Figure 7:
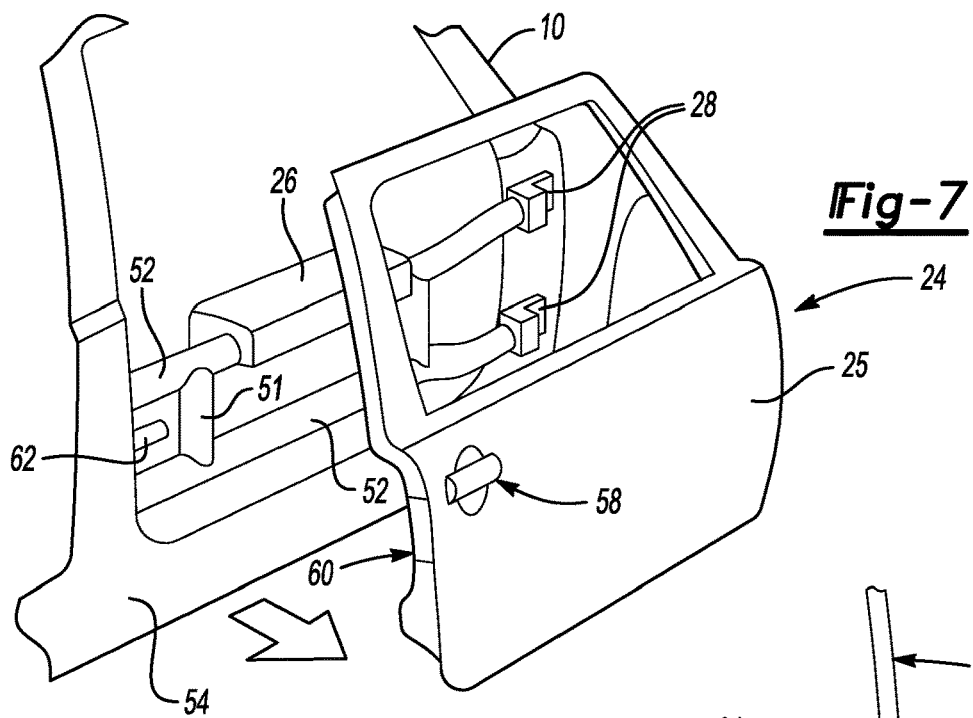
FIG. 7 is a schematic view of an example door assembly.
Figure 8:
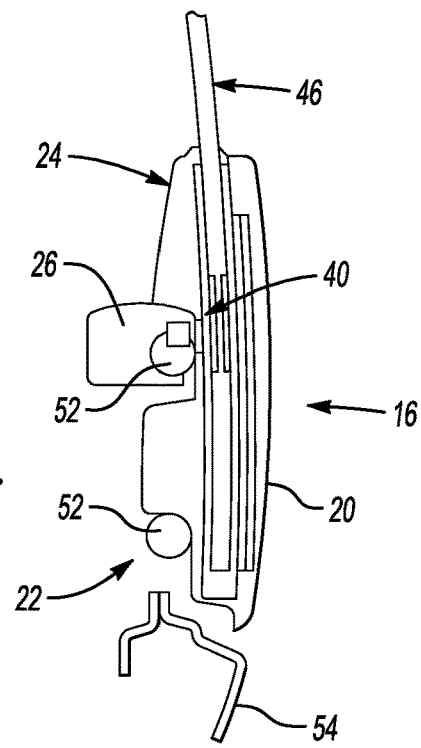
FIG. 8 is a cross-sectional view of the example door assembly.
Figure 9:
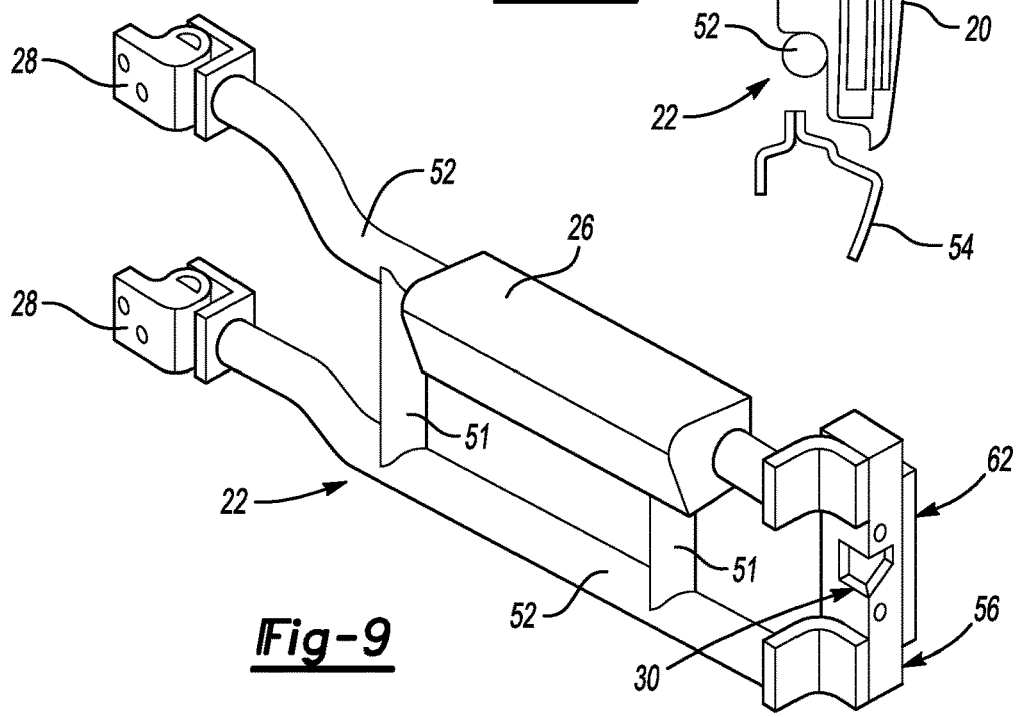
FIG. 9 is a perspective view of an example gate assembly.

Referring to FIGS. 7, 8, and 9, the latch 30 to secure the door assembly in a closed position is mounted to the gate assembly 22. Hinges 28 support the gate assembly 22 on the vehicle 10. The hinges 28 need not be accessible from the exterior of the door and vehicle because the gate assembly 22 is not removed from the vehicle 10. Instead, when a vehicle operator desires an open-air feel, only the outer door assembly 24 is removed. In this example, the gate assembly includes tubular cross beams 52 that are coupled together with stiffeners 51. The outer door 24 includes the window and outer surface 20 that matches the contours of other vehicle body panels such as the rocker panel 54 to enclose the vehicle cabin. The gate assembly 22 includes the hinge 28 and latch 30 as well as supports any electrical controls. Moreover, the gate assembly 22 is structured and configured to provide any collision protection required to meet any applicable standards.

The outer door 24 includes an outer handle 58 that includes a linkage 60 that couples to a linkage 62 present on the gate assembly 22. The linkage mechanism 60 couples to a comparable mechanism 62 provided on the gate assembly 22. The linkage between the portions 60 and 62 enables operation of the latch 30 by way of the outer door latch handle 58. The gate assembly 22 may include a lock actuator schematically shown at 56 for locking the latch 30 automatically or upon a prompt by a switch 38 on the control panel 36.

Referring to FIGS. 10 and 11, another door assembly 70 is illustrated and includes an alternate connection mechanism. In the disclosed example door assembly 70 embodiment, a gate assembly 72 includes several openings 78 that receive flanges 76 of the outer door assembly 74. The flanges 76 and receiver 78 are aligned and coupled together to secure the outer door 74 to the gate assembly 72 without additional tools or fasteners.

Figure 12:
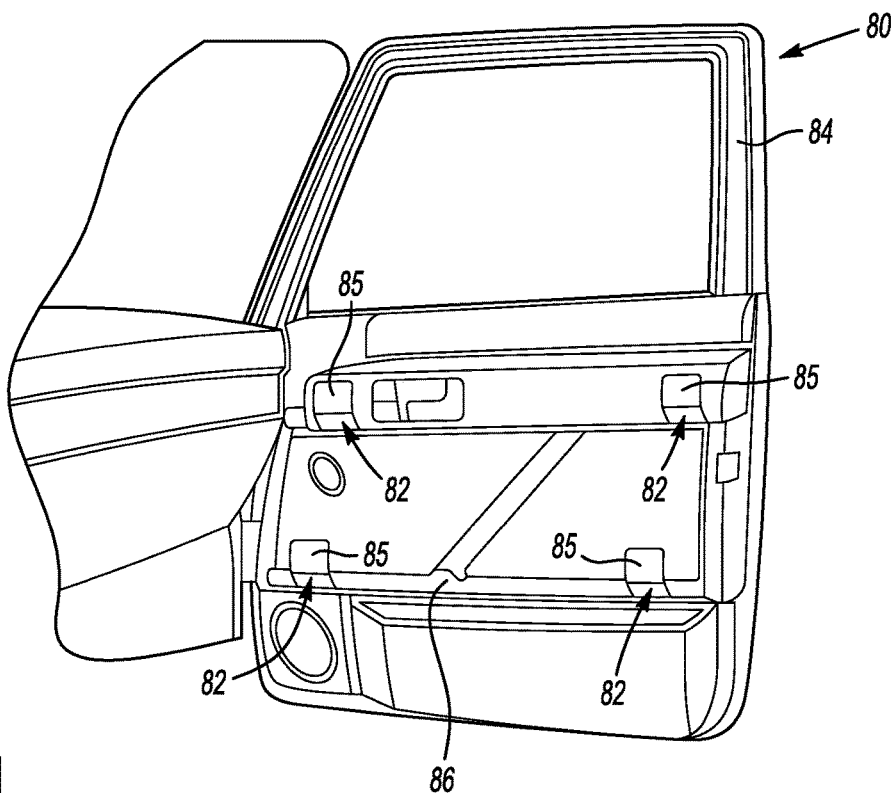
FIG. 12 is a side view of another example door assembly embodiment.

Referring to FIG. 12, another example door assembly 80 is illustrated and includes an outer door assembly 84 and a gate assembly 86. The outer door assembly 84 is attached to the gate assembly 86 by way of a plurality of clamps 82. In this disclosed example the clamps 82 include a handle 85 that is actuated to disengage the outer door assembly 84 from the inner gate assembly 86.

Figure 14:
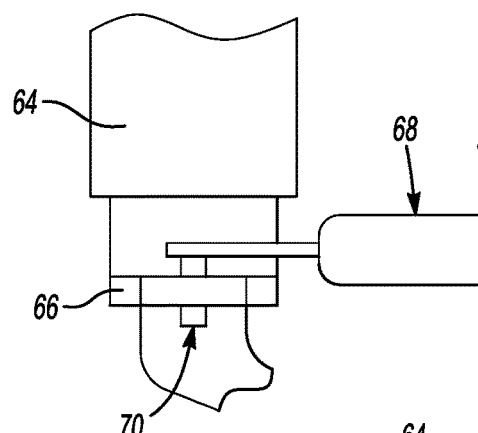
FIG. 14 is an enlarged view of a portion of the side view mirror coupling system.
Figure 13:
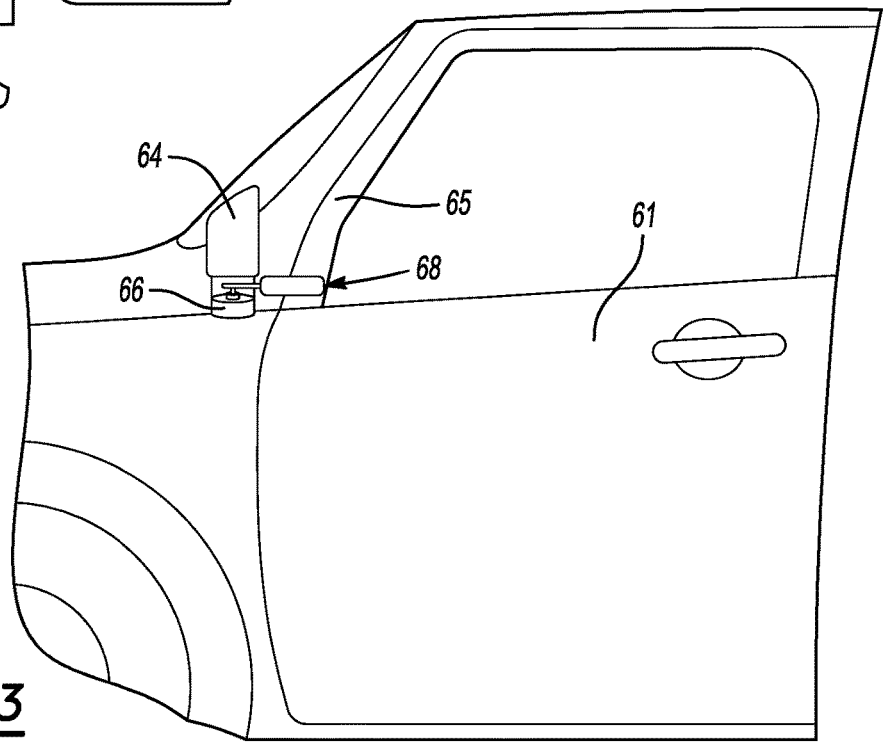
FIG. 13 is in a side view of an example side mirror coupling system.

Referring to FIGS. 13 and 14 a side-view mirror assembly 64 includes a mount 66 that is coupled to a pivot of link 68. The pivot link 68 is connected to portion 65 of the outer door to enable pivoting of the side mirror assembly 64 upon opening of the door 61. Pivoting of the side mirror 64 enables movement of the side mirror 64 to prevent obstruction or undesired contact with the door 61 when it is moved to an open position.

Referring to FIG. 14 with continued reference to FIG. 13, an example linking mechanism includes a link 68 attached to the outer door 65 of the vehicle 10. The link 68 couples to a portion of the base 66 supporting the side view mirror 64 with a pivotal connection. The pivotal connection enables the side view mirror 64 to pivot out of the way in response to opening of the vehicle door 61.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A reconfigurable vehicle door assembly comprising:
a gate subassembly including an electrical control panel and a latch handle is secured by hinges and a latch to vehicle static structure; and
an outer door subassembly removably secured to the gate subassembly by at least one quick connect mechanism, the outer door including a window assembly operable by the electrical control panel.

2. The reconfigurable vehicle door assembly as recited in claim 1, wherein the electrical control panel includes a lock switch and a window switch.

3. The reconfigurable vehicle door assembly as recited in claim 2, including an electrical interface that includes a first portion fixed to the gate subassembly and a second portion fixed to the outer door subassembly and mounting of the outer door subassembly to the gate assembly automatically aligns and connects the first portion to the second portion.

4. The reconfigurable vehicle door assembly as recited in claim 3, wherein the window assembly within the outer door subassembly includes an actuator receiving electrical signals through the electrical interface and that is operable by the window switch.

5. The reconfigurable vehicle door assembly as recited in claim 4, wherein the electrical interface includes an electrical connection for at least one electrical appliance other than the actuator disposed within the outer door assembly.

6. The reconfigurable vehicle door assembly as recited in claim 1, wherein the gate subassembly comprises upper and lower tubular cross-beams.

7. The reconfigurable vehicle door assembly as recited in claim 1, wherein the gate subassembly includes an armrest that remains mounted to the gate subassembly when the outer door assembly is removed.

8. The reconfigurable vehicle door assembly as recited in claim 1, wherein the at least one quick connect mechanism comprises clamps that clamp to portions of the gate subassembly.

9. The reconfigurable vehicle door assembly as recited in claim 1, wherein the outer door assembly includes an outer door latch handle that is operable to actuate the latch when the outer door assembly is secured to the gate subassembly.

10. The reconfigurable vehicle door assembly as recited in claim 1, wherein the outer door subassembly includes an outer surface spaced apart from an inner surface and the window assembly is disposed within a space between the inner surface and the outer surface.

11. The reconfigurable vehicle door assembly as recited in claim 1, wherein the latch includes an actuator for moving the latch between a locked condition and an unlocked condition.

12. The reconfigurable vehicle door assembly as recited in claim 1, including a coupling between a side view mirror mounted to the vehicle static structure and the outer door subassembly such that the side view mirror moves with the outer door subassembly when moved between open and closed positions.

13. A reconfigurable vehicle door assembly comprising:
a gate subassembly having an armrest including an electrical control panel and an inner latch handle, the gate secured by hinges and a latch to a vehicle static structure;
an outer door subassembly removably secured to the gate subassembly by at least two clamps, the outer door including a window assembly operable by a window switch of the electrical control panel.

14. The reconfigurable vehicle door assembly as recited in claim 13, including an electrical interface that includes a first portion fixed to the gate subassembly and a second portion fixed to the outer door subassembly and mounting of the outer door subassembly to the gate assembly automatically aligns and connects the first portion to the second portion.

15. The reconfigurable vehicle door assembly as recited in claim 14, wherein the outer door assembly includes an outer latch handle that is operable to actuate the latch when the outer door assembly is secured to the gate subassembly.

16. A method of assembling a reconfigurable vehicle door comprising:
- mounting a gate to a static structure by hinges and a latch;
- removably attaching an outer door to the gate with at least one clamp; and
- coupling a first electrical interface portion disposed on the gate to a second electrical interface portion disposed on the outer door to provide electrical communication between a switch on the gate and an actuator within the outer door.

17. The method as recited in claim 16, including coupling an outer latch handle to the latch when attaching the outer door to the gate.

18. The method as recited in claim 16, wherein the gate includes an armrest having an electrical control and an inner latch handle and the first electrical interface portion is supported within the armrest.

\* \* \* \* \*